(12) United States Patent
Clack (10) Patent No.: US 7,690,914 B1
(45) Date of Patent: Apr. 6, 2010

(54) APPARATUS FOR MAKING A BLOW MOLDED ARTICLE WITH INTEGRAL INSERT

(75) Inventor: Robert A. Clack, Sun Prairie, WI (US)

(73) Assignee: Clack Corporation, Windsor, WI (US)

( * ) Notice: Subject to any disclaimer, the term of this patent is extended or adjusted under 35 U.S.C. 154(b) by 0 days.

(21) Appl. No.: 12/247,719

(22) Filed: Oct. 8, 2008

Related U.S. Application Data (62) Division of application No. 10/947,517, filed on Sep. 22, 2004, now Pat. No. 7,476,354.

(51) Int. Cl.
B29C 49/20 (2006.01)

(52) U.S. Cl. .................. 425/503; 425/522; 425/525; 425/535

(58) Field of Classification Search ............. 425/126.1, 425/503, 522, 525, 535
See application file for complete search history.

(56) References Cited

U.S. PATENT DOCUMENTS

| | | | | |
|---|---|---|---|---|
| 3,437,231 | A | * | 4/1969 | Carpenter, Jr. ............. 220/601 |
| 3,705,931 | A | * | 12/1972 | Confer et al. ............. 425/503 |
| 3,861,851 | A | * | 1/1975 | Schiemann ................ 425/525 |
| 3,919,373 | A | | 11/1975 | Kormendi |
| 3,919,374 | A | * | 11/1975 | Komendowski ........... 264/525 |
| 3,969,812 | A | | 7/1976 | Beck |
| 4,021,180 | A | | 5/1977 | Smith |
| 4,214,611 | A | | 7/1980 | Takacs et al. |
| 4,362,686 | A | | 12/1982 | Clishem et al. |
| 4,397,629 | A | * | 8/1983 | Akutsu et al. ............ 425/525 |
| 4,438,858 | A | | 3/1984 | Grover |
| 4,518,558 | A | | 5/1985 | Anway et al. |
| 4,539,172 | A | * | 9/1985 | Winchell et al. ........... 425/503 |
| 4,589,563 | A | * | 5/1986 | Born ........................ 264/516 |
| 4,627,810 | A | | 12/1986 | Von Holdt |
| 4,705,468 | A | | 11/1987 | LeBreton |
| 4,719,072 | A | | 1/1988 | Kojima et al. |
| 4,740,262 | A | | 4/1988 | Yavorsky et al. |

(Continued)

FOREIGN PATENT DOCUMENTS

CA    2 412 509    1/2002

(Continued)

OTHER PUBLICATIONS

Roehr Tool Corporation, website printout regarding "The Expandable Cavity", undated, 2 pages.

Primary Examiner—Robert B Davis
(74) Attorney, Agent, or Firm—Boyle Fredrickson, S.C.

(57) ABSTRACT

A mold assembly includes a collapsible mount for releasably holding an insert within a mold cavity of the assembly in order to integrally form the insert with a molded article such as a tank liner. The collapsible mount includes a number of fingers secured to the mount and capable of being inserted through and expanded to engage the insert. The fingers are expanded after insertion through the insert by a core engageable with the fingers in order to securely hold the insert in position on the fingers of the mount and within the mold cavity. After formation of the article around the insert, the core can be disengaged from the fingers, which then move to a collapsed position such that the mount can be quickly withdrawn from within the insert and the mold cavity.

10 Claims, 11 Drawing Sheets

U.S. PATENT DOCUMENTS

| | | | |
|---|---|---|---|
| 4,771,981 A | 9/1988 | Little et al. | |
| 4,778,073 A | 10/1988 | Ehs | |
| 4,785,956 A | 11/1988 | Kepler et al. | |
| 4,929,410 A * | 5/1990 | Meyer et al. | 425/535 |
| 4,952,347 A | 8/1990 | Kasugai | |
| 5,002,623 A | 3/1991 | Steer et al. | |
| 5,174,466 A | 12/1992 | Matyja | |
| 5,253,778 A | 10/1993 | Sirosh | |
| 5,308,427 A | 5/1994 | Duhaime et al. | |
| 5,314,323 A | 5/1994 | Bolles | |
| 5,356,589 A | 10/1994 | Sugalski | |
| 5,387,389 A | 2/1995 | Catalanotti et al. | |
| 5,429,845 A | 7/1995 | Newhouse et al. | |
| 5,445,783 A | 8/1995 | Irish et al. | |
| 5,529,743 A | 6/1996 | Powell | |
| 5,538,680 A | 7/1996 | Enders | |
| 5,556,497 A | 9/1996 | Murphy et al. | |
| 5,558,895 A | 9/1996 | Boyhan | |
| 5,584,411 A | 12/1996 | Channell et al. | |
| 5,624,694 A | 4/1997 | Delaby et al. | |
| 5,819,978 A | 10/1998 | Hlebovy | |
| 5,820,415 A | 10/1998 | Chen | |
| 5,900,107 A | 5/1999 | Murphy et al. | |
| 5,925,303 A | 7/1999 | Scheliga | |
| 6,099,766 A | 8/2000 | Aoki et al. | |
| 6,171,423 B1 | 1/2001 | Murphy et al. | |
| 6,190,598 B1 | 2/2001 | Murphy et al. | |
| 6,193,924 B1 | 2/2001 | Huse | |
| 6,298,553 B1 | 10/2001 | Hlebovy | |
| 6,337,044 B1 | 1/2002 | Wang et al. | |
| 6,415,941 B1 | 7/2002 | Huse | |
| 6,866,812 B2 | 3/2005 | Van Schaftingen et al. | |

FOREIGN PATENT DOCUMENTS

| | | |
|---|---|---|
| CA | 2 412 509 A1 | 1/2002 |

* cited by examiner

APPARATUS FOR MAKING A BLOW MOLDED ARTICLE WITH INTEGRAL INSERT

CROSS-REFERENCE TO RELATED APPLICATION

The present application is a divisional application of U.S. Ser. No. 10/947,517, filed Sep. 22, 2004 now U.S. Pat. No. 7,476,354, entitled "Method and Apparatus for Making A Blow Molded Article With Integral Insert", the disclosure of which is incorporated herein in its entirety by reference.

FIELD OF THE INVENTION

The present invention relates to molded plastic articles and methods for molding plastic articles, and more particularly to an apparatus and method for forming a one-piece, hollow, blow molded article such as a tank liner including an insert integrally molded with the article.

DISCUSSION OF THE RELATED ART

An insert or fixture often must be secured to a blow molded article in order to enable the article to be utilized in the desired manner. For instance, the insert may be stronger, be better able to hold dimensional tolerances, or have other physical characteristics that are superior to those of the blow molded article for a particular purpose. The article is often blow molded onto a previously-formed insert to negate the need to bond the insert to a preformed article.

For instance, a water softener resin tank liner is often blow molded onto a premanufactured injection molded threaded insert. The insert serves as a mounting point for the water softener's control valve after the tank liner is reinforced with a fiberglass wrap to form a completed resin tank. In one such process, a threaded insert is screwed onto a mandrel that is capable of positioning the insert within a mold cavity in which the tank liner is formed. In this method, the insert is first positioned on the mandrel, which is then moved to position the insert at a desired location within the mold cavity. Plastic material is then blown into the cavity in a conventional blow molding process to cause the plastic material to conform to the shape of the mold cavity and surround the insert to form the tank liner. As the plastic material cools around the insert, the insert becomes fixed to the tank liner. When the tank liner is sufficiently cool, the mandrel is disengaged from the insert and withdrawn from the mold such that the tank liner and insert can be removed from within the mold cavity and the process can begin again to form a second tank liner with another insert.

When blow molding a water softener resin tank liner about a threaded insert, the mandrel must also include a correspondingly threaded exterior surface in order to securely hold the insert on the mandrel before and during the molding process, and to enable the mandrel to easily engage the insert without damaging the threads on the softer insert. When inserts and mandrels having threaded surfaces are utilized in processes of this type, after the tank liner has been formed around the insert within the mold cavity, the mandrel is rotated and lowered simultaneously to disengage the mandrel from the insert. This synchronization is difficult to achieve and maintain on a production basis and is usually synchronized with the mold opening process. The mandrel is rotated and lowered at a very low speed to avoid damaging the threads on the insert. However, based on the precise synchronization required for the speeds of rotation and lowering of the mandrel in conjunction with part removal, and on the normal variances in the manufacture of the threads on the inserts used, often times the mandrel damages the threads on the insert.

Care must also be taken to assure that the mandrel seals against the insert in a manner that prevents plastic from the parison from seeping into the insert from below and ruining the threads. This seal can be achieved using a threaded mandrel, but forming such a seal is hindered by the fact that some tolerance must be provided between the mandrel and the threads of the insert to accommodate non-uniformities in size and/or diameter of the mandrel and/or insert.

In addition to the problems associated with the presence of the threads on the interior of the insert by the mandrel, the cycle time requirements for properly attaching the insert on the mandrel prior to placement of the insert within the mold cavity also present a significant limitation to the process of forming a tank liner with an insert in this manner. Specifically, because the insert and mandrel must be initially threadedly engaged with one another to securely position and hold the insert within the mold cavity, a significant amount of time is required to properly engage the insert with the mandrel. In addition, the slow speeds required when withdrawing the mandrel from the insert to avoid damaging the threads on the insert further increase the overall cycle time for this process.

Therefore, it is desirable to develop an apparatus and method for supporting an insert within a mold cavity used to form a tank liner or other blow molded article that does not damage the insert while moving and/or holding the insert within the mold cavity or when disengaging from the insert after formation of the article. It is also desirable to develop an apparatus and method that can greatly decrease the cycle time for forming the article by decreasing the overall time required for engaging a mandrel with an insert, moving the mandrel to position the insert within the mold cavity, and withdrawing the mandrel from the insert after formation of the article within the cavity.

SUMMARY OF THE INVENTION

According to a first aspect of the present invention, the apparatus and method includes a radially collapsible mount for engaging, supporting, and positioning an insert within a mold cavity. The mount may include a number of fingers that are movable between an expanded and a collapsed position. In the collapsed position, the mount can receive the insert. An expanding mechanism, preferably a vertically moveable plunger or core, is operated to drive the fingers of the mount outwardly to the expanded position and into contact with the interior surface of the insert. The fingers securely hold the insert on the mount during the subsequent blow molding process. In addition to holding the insert in place, the fingers eliminate any eccentricity in the insert and retain the insert's concentricity during the molding process. They also form a seal with the insert and with the core so as to permit air pressure to build up within the mold and inflate the parison to form the article.

After the article has been formed around the insert in a blow molding process, the expanding mechanism disengages from the mount, such that each of the fingers of the mount moves inwardly into the collapsed position and disengages from the insert. If the mount is vertically movable, the mount can then be retracted out of the insert without damaging the threaded interior surface of the insert. The speed at which the mount is retracted from the insert can also be increased to decrease the overall cycle time for the forming of an article, as no portion of the mount remains in contact with the insert once the fingers are moved to the collapsed position. After the collapsible mount is disengaged from the insert, the mold cavity can be opened and the newly formed article can be removed. At the same time, the collapsible mount can be engaged with another insert in order to be ready for reinsertion into the mold cavity in preparation of the formation of another article.

According to another aspect of a preferred embodiment of the present invention, the mount can be designed to incorporate any number of collapsible fingers in any desired shape, with a correspondingly shaped expanding mechanism, such that the mount can be utilized with inserts having various configurations.

According to still another aspect of the preferred embodiment of the present invention, because the operation of the mount requires only the vertical movement of the expander mechanism relative to the mount, the engagement and disengagement of successive inserts with the mount can be accomplished completely automatically. This further decreases the overall cycle time in addition to the cycle time reduction accomplished by the increase in speed of disengagement of the collapsible mount from the insert.

The invention additionally relates to a method of forming a tank liner or other article of a plastic material in a blow molding process in which an insert is engaged by and positioned within a mold cavity to be integrally formed with the article by a radially collapsible mount at least generally of the type discussed above.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals designate like parts throughout.

DETAILED DESCRIPTION OF THE PREFERRED EMBODIMENTS OF THE INVENTION

Figure 1:
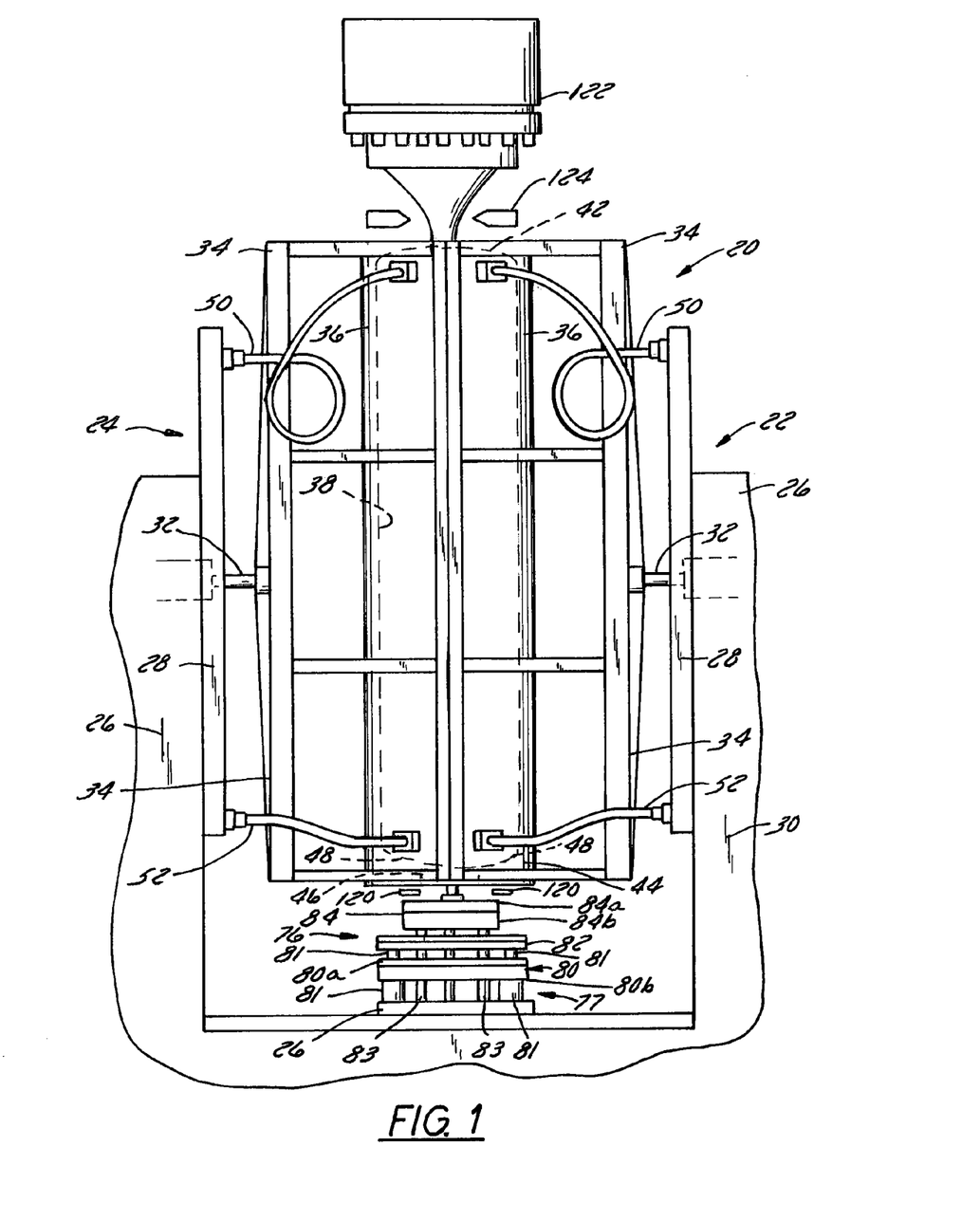
FIG. 1 is a perspective view of a mold assembly including the insert collapsible mount constructed in accordance with a preferred embodiment of the present invention.
Figure 2:
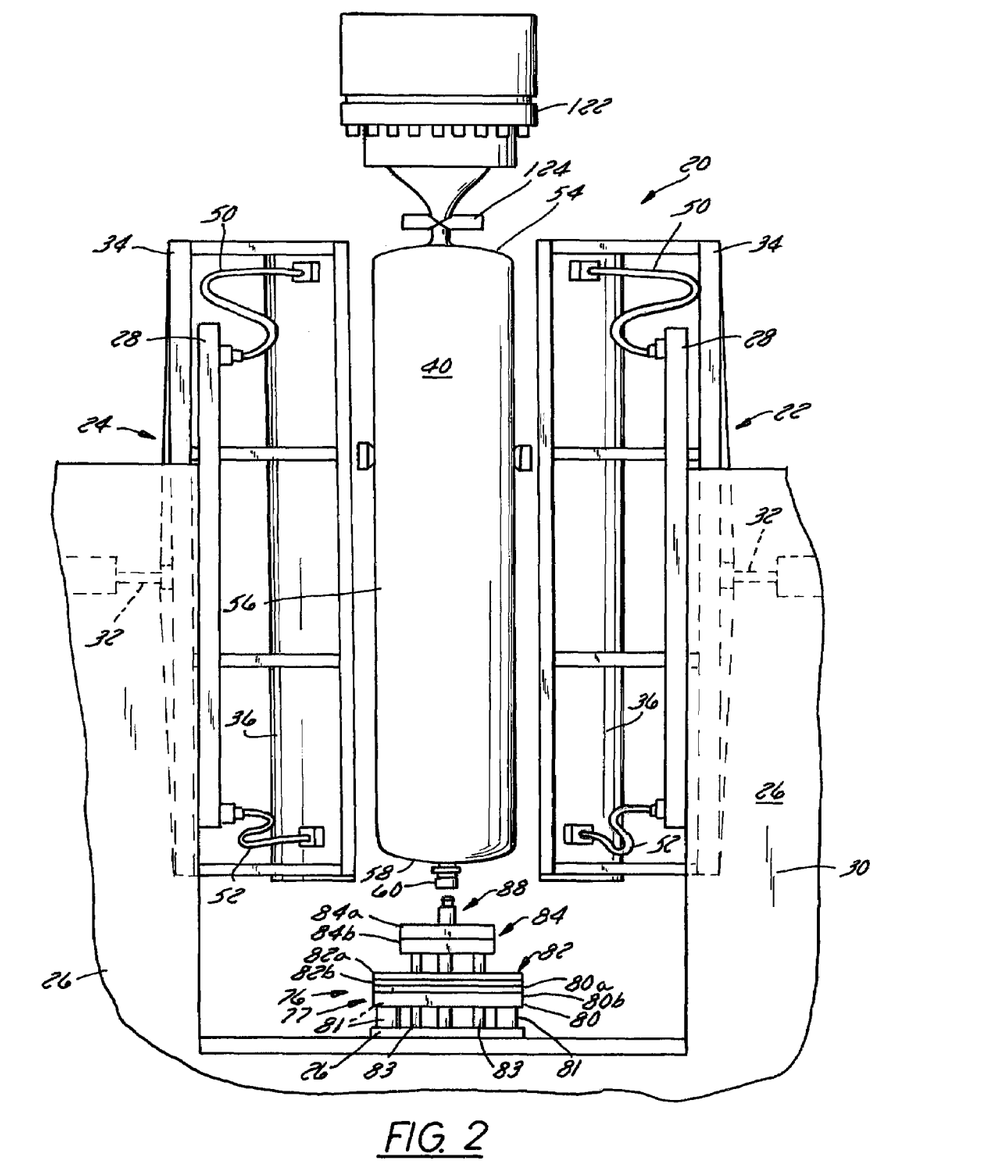
FIG. 2 is a perspective view of the mold assembly and the collapsible mount of FIG. 1 with the mold assembly in the open position exposing a tank liner formed therein.

Referring now to the drawing figures in which like reference numerals designate like parts throughout the disclosure, a blow molding apparatus is indicated generally at 20 in FIGS. 1 and 2. The apparatus 20 includes a pair of opposed platens 22 and 24 disposed on opposite sides of a support structure 26 in a frame 30. The platens 22 and 24 each support a mold section 36 and can be driven horizontally toward and away from one another by cylinders 32 in order to open and close a mold cavity 38. The mold sections 36 are also supplied with cooling water via lines 50 and 52.

When the platens 22 and 24 are moved toward one another, the mold sections 36 form a generally enclosed mold cavity 38 therebetween that defines the desired shape of a tank liner 40 to be formed therein. The mold cavity 38 has a closed upper end 42, and an open lower end 44 that defines an opening 46 formed by a pair of generally semicircular recesses 48 located in each mold section 36. The mold sections 36 can also include an aligning mechanism, such as a number of pins (not shown) disposed on one mold section 36 that are slidably engageable with collars (not shown) disposed on the opposite mold section 36 to ensure the proper alignment of the mold sections 36 to form the mold cavity 38.

Referring now to FIGS. 2-5, the tank liner 40 formed within the mold cavity 38 is formed of any suitable plastic material that can be molded within the cavity 38 in a conventional blow molding process. For example, the plastic material used can be HDPE. Further, while the tank liner 40 can have any number of shapes, in a particularly preferred embodiment, and to enhance the ability of the tank liner 40 to function as a water conditioner tank liner, the tank liner 40 is formed to be generally cylindrical in shape with a rounded, closed bottom end 54, a sidewall 56 extending from the bottom end 54, and a rounded, open upper end 58 located on the sidewall 56 opposite the bottom end 54. The upper end 58 includes an opening 60 that is defined by an insert 62 integrally foamed around the opening 60 in the upper end 58 of the tank liner 40. The insert 62 is formed of a material having different physical properties than that of the tank liner 40. It preferably is formed of a relatively high strength injection molded plastic material, such as a glass filled polypropylene or another engineering plastic.

Figure 3:
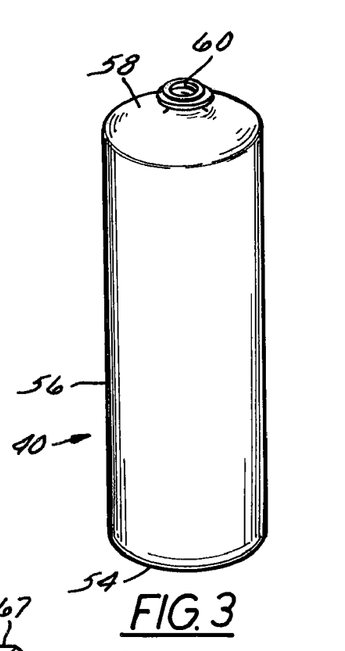
FIG. 3 is a perspective view of the tank liner of FIG. 2.
Figure 4:
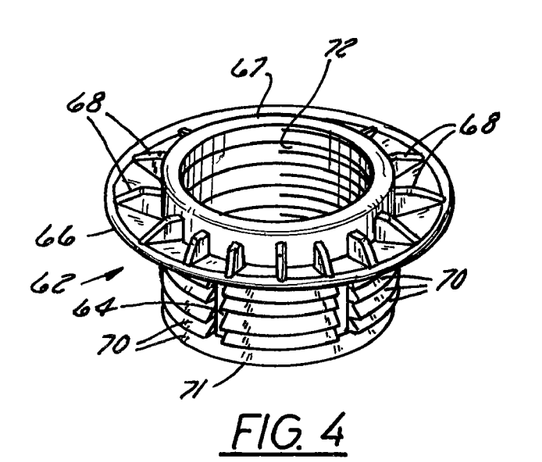
FIG. 4 is a perspective view of an insert secured to the tank liner of FIG. 3.
Figure 5:
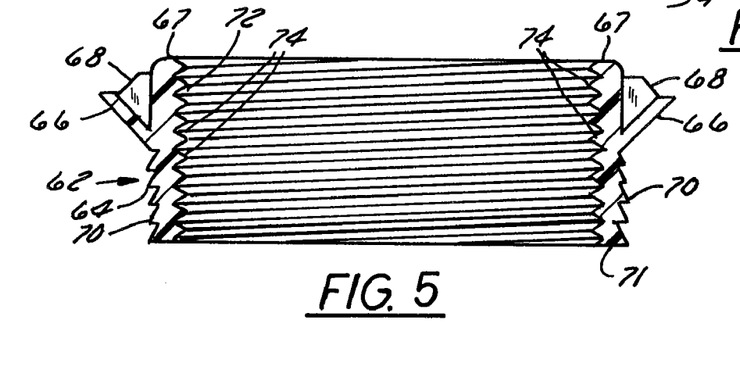
FIG. 5 is a cross-sectional elevation of the insert of FIG. 4.

Referring to FIGS. 3-5, the insert 62 is preferably generally circular or cylindrical in shape, but can be formed to have other geometric shapes as well, including rectangular, square, hexagonal and octagonal, among others. An exterior surface 64 of the insert 62 includes an angled peripheral flange 66 adjacent one end 67 that is supported on the exterior surface 64 by a number of radially extending reinforcing gussets 68 extending between the insert 62 and the flange 66. The flange 66 and gussets 68, in conjunction with a number of annular ribs 70, provides additional rigidity to the insert 62, and are also used to hold the insert 62 in engagement within the opening 60 in the tank liner 40. The insert 62 also includes an interior surface 72 which has threads 74 formed thereon that are engageable with corresponding threads (not shown) on a water conditioner control valve (not shown).

Referring again to FIGS. 1 and 2, the molding apparatus 20 also includes a radially collapsible mount assembly 76 configured to position the insert 62 within the mold cavity 38 prior to and during the formation of the tank liner 40. The mount assembly 76 could take a number of configurations, so long as it is capable of 1) reciprocating vertically into and out of the insert 62, either unaided or in conjunction with or replaced by manual or automated vertical movement of the insert 62 and/or the mold, and 2) expanding and contracting radially to selectively grip and release the insert. In the preferred embodiment, the mount assembly comprises a support and lift arrangement 77 positioned directly beneath the mold cavity 38 and a collapsible mount 88 supported on the support and actuation arrangement 77. The entire assembly 76 can be raised and lowered as a unit by extending and retracting a piston 79.

Figure 6:
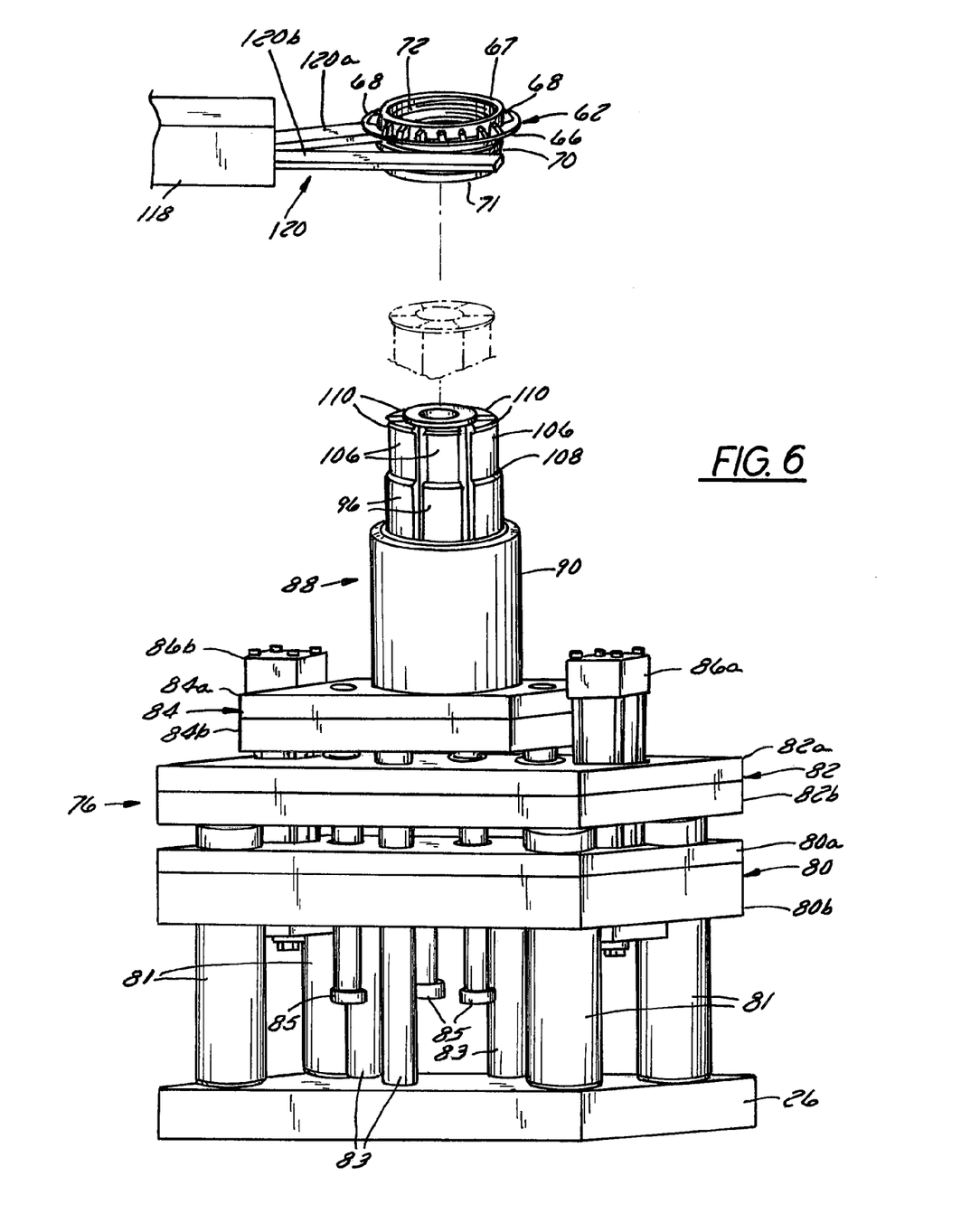
FIGS. 6 and 6A are perspective views of the collapsible mount of FIG. 1.
Figure 6A:
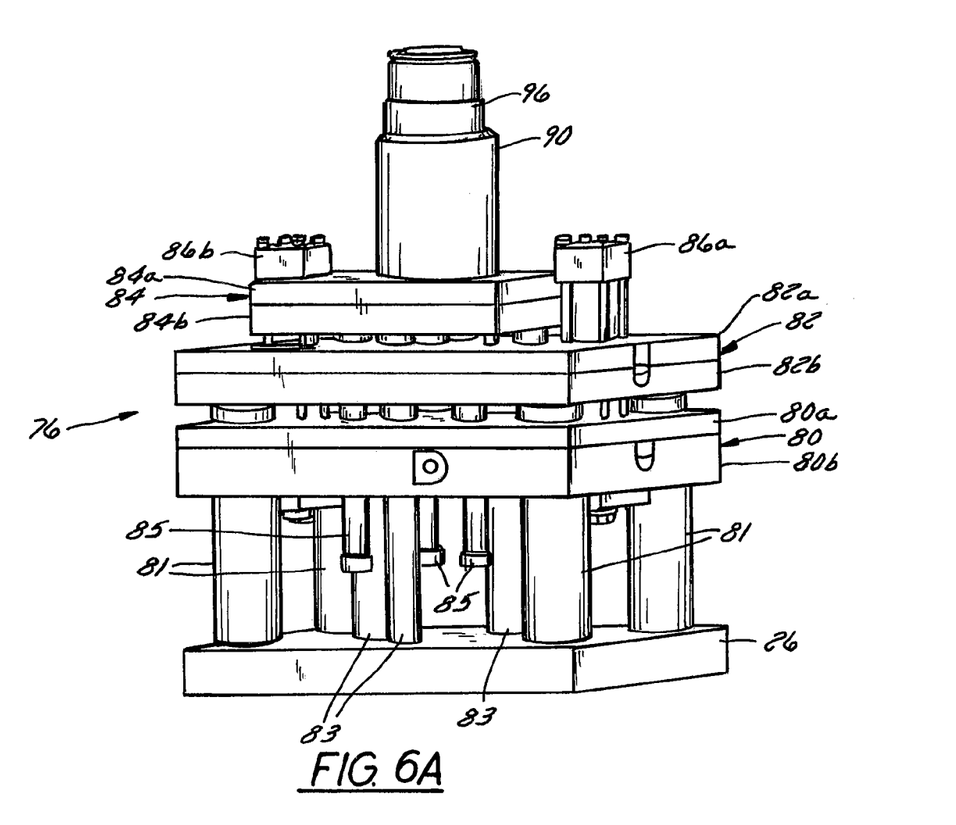
Figure 6B:
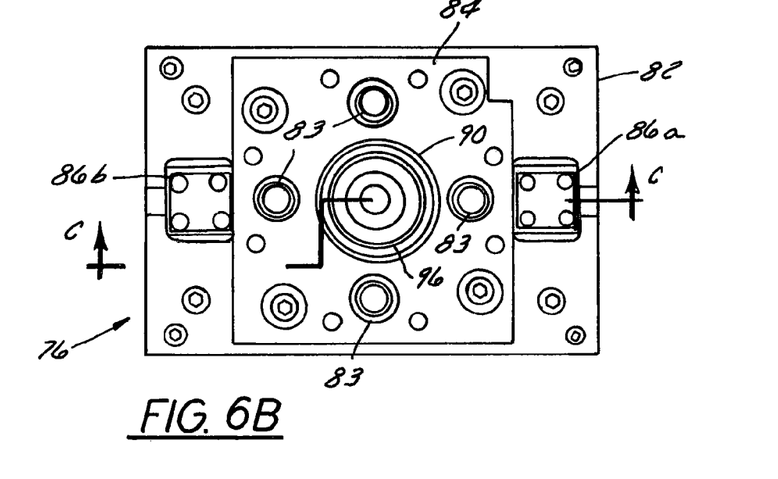
FIG. 6B is a top plan view of the collapsible mount.
Figure 6C:
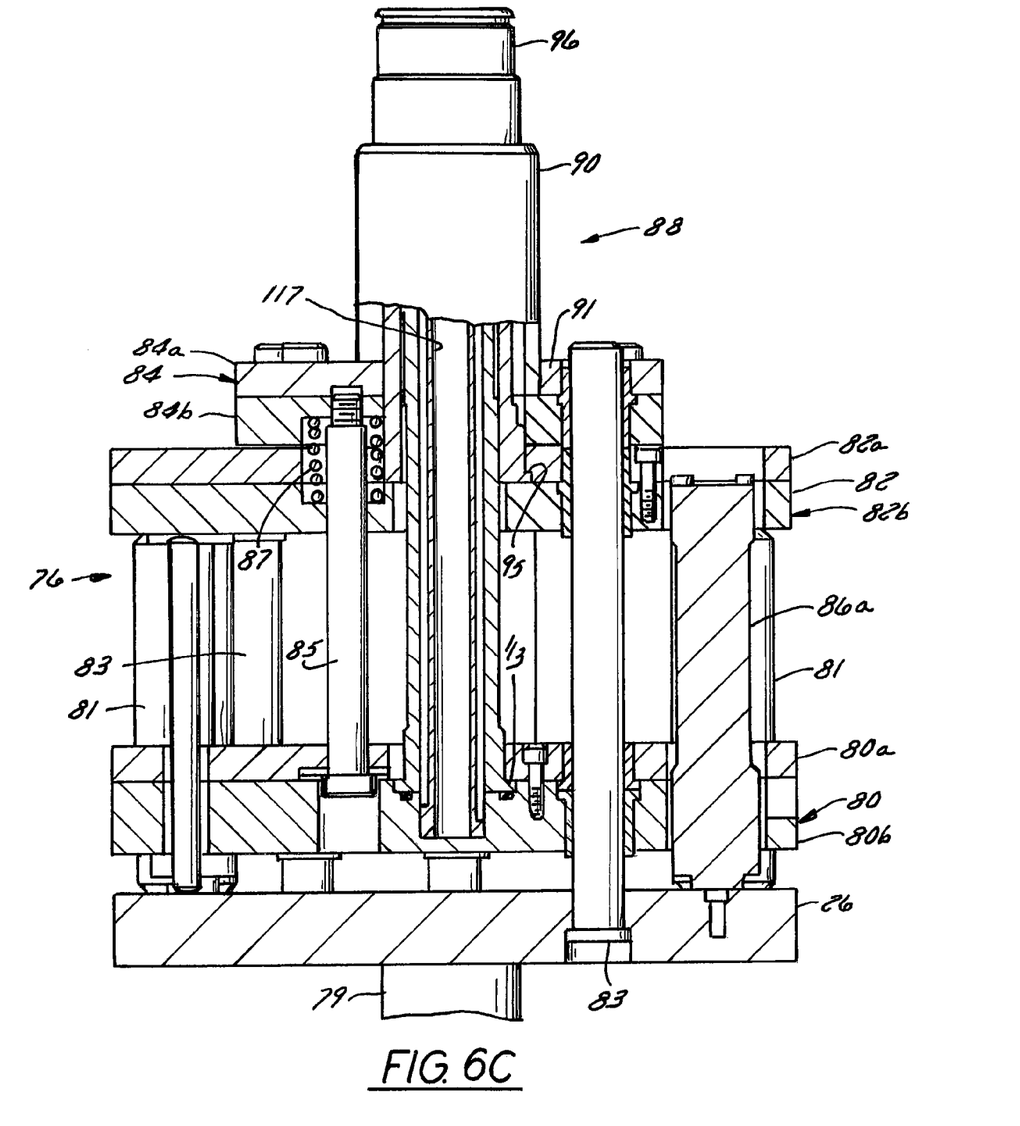
FIGS. 6C and 6D are sectional side elevation views, taken along the lines C-C in FIG. 6B and showing the assembly in lowered and raised positions, respectively.
Figure 6D:
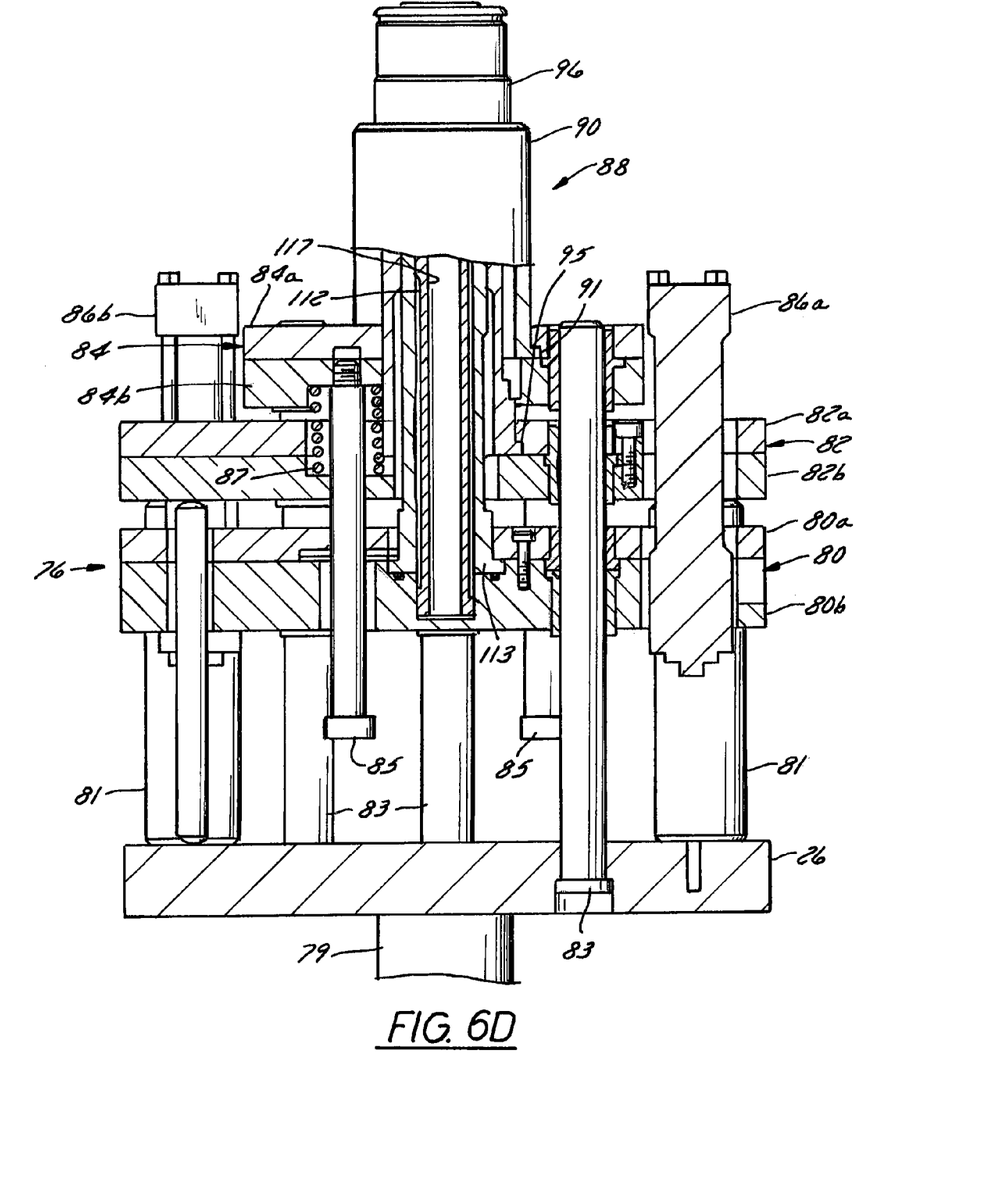

As best seen in FIGS. 6A-6D, the support and actuation arrangement 77 includes a base plate 26 and first, second and third platforms or plate assemblies 80, 82, and 84, each of which is formed from a pair of bolted stacked plates 80a, 80b; 82a, 82b; and 84a, 84b, respectively. The plate assembly 82 is affixed to rods 81 that are mounted near the corners of the base plate 26 and that extend trough apertures in the plate assembly 80. Additional guide rods 83 extend upwardly from the base plate 26 and through the plate assemblies 80, 82 and 84. The plate assembly 80 is driven to move vertically along the rods 81 and 83 by a pair of hydraulic cylinders 86a and 86b that extend upwardly through the plate assembly 82 when extended. In addition, shoulder bolts 85 are affixed to the plate assembly 84 at their upper ends and pass through aligned apertures in the plate assemblies 82, and 80 and end beneath the bottom of plate assembly 80. Springs 87 are positioned between the plate assemblies 82 and 84, preferably in counterbores in the top of plate assembly 82 in surrounding relationships with the shoulder bolts 85, to normally bias the plate assembly 84 upwardly away from the plate assembly 82 as seen in FIG. 6D. This arrangement provides for limited downward movement of plate assemblies 82 and 84 at the end of the down stroke of the plate assembly 80 as seen in FIG. 6C to provide a positive retract of the fingers (if desired) as described in greater detail below.

The collapsible mount 88 preferably comprises a device used as a collapsible core used in injection molding processes and available, e.g., from Roehr Tool Corporation of Hudson, Mass. As best seen in FIGS. 7-12, the collapsible mount 88 includes a collar 90 and a sleeve 94. The collar 90 has a mounting ring 91 clamped between the plates 84a and 84b of plate assembly 84 and extending upwardly through and beyond opening 92 in the plate assembly 84. The sleeve 94 is positioned within the collar 90, extends downwardly though the opening 92 in the plate assembly 84, and into an aligned through opening 93 in the plate assembly 82, wherein it terminates in a mounting ring 95 clamped between the plates 82a and 82b of plate assembly 82. The sleeve 94 is formed of a generally rigid material, such as aluminum or steel. The sleeve 94 is segmented into a number of upwardly extending fingers 96 spaced about the periphery of the sleeve 94. Each finger 96 includes a relatively thin lower section 98 extending upwardly from the collar 90 and a relatively thick upper section 100 connected to the lower section 98. The interior surface 99 of the upper section 100 on each finger 96 includes a lower, inwardly tapering inner surface 102 adjacent the lower section 98, and an upper vertical inner surface 104 adjacent the tapering surface 102 and opposite the lower section 98. The tapering surfaces 102 of each finger 96 form a narrowing throat 114 on the interior of the sleeve 94. The exterior surface 105 of the upper section 100 of each finger 96 includes a peripheral recess 106 generally opposite the vertical surface 104 that terminates at an upper peripheral tab. The exterior surface 105 of each finger 96 is also stepped at 108 to form a surface therebeneath that is configured to seal radially against the inner diameter of the insert 62 at a location beneath the bottommost thread. If desired, a protrusion 107 may also be formed on the exterior surface 105 beneath the shoulder of each finger for cooperating with an inwardly protruding lip 109 at the upper end of the collar 90 during the positive retract phase of the withdrawal process. Also, while the collar 90 and sleeve 94 forming the mount 88 are illustrated in the preferred embodiment to be generally circular in cross-section, the shape of the components of the mount 88 can be adjusted in order to form a mount 88 compatible with the shape of the particular insert 62 being used.

Figures 7, 8, 9:
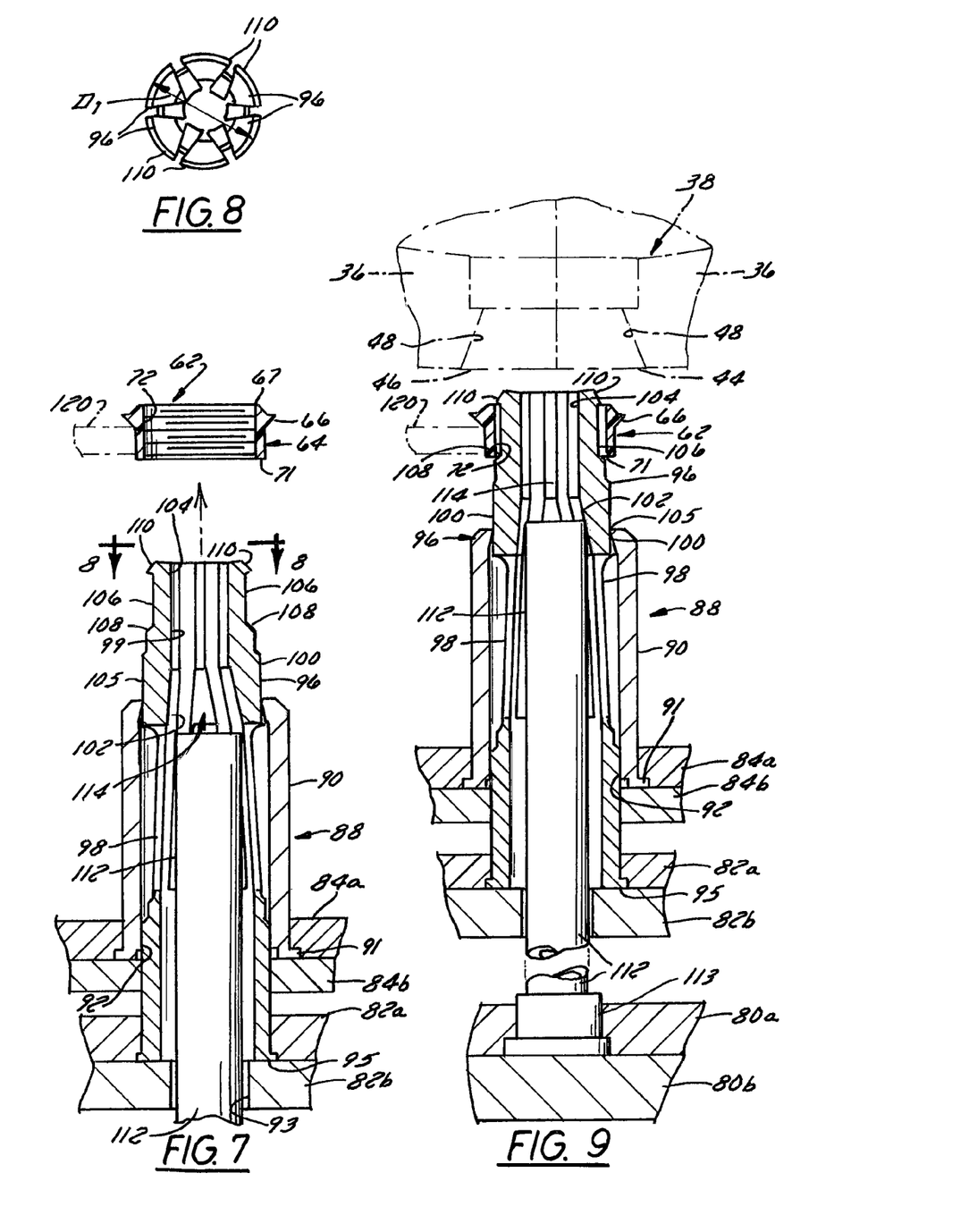
FIG. 7 is a cross-sectional elevation of the collapsible mount of FIG. 6, showing a mount assembly of the apparatus in a mold approaching position thereof.
FIG. 8 is a cross-sectional elevation view taken generally along line 8-8 of FIG. 7.
FIG. 9 is a cross-sectional elevation view corresponding to FIG. 7 and showing the collapsible mount extended through the insert.

The particular configuration of each of the fingers 96, including the thin lower section 98 and thicker upper section 100, produces an inherent inward bias that urges the fingers 96 to flex inwardly towards one another into the configuration shown best in FIGS. 7-9. In this configuration, the diameter D1 (FIG. 8) circumscribed around each of the upper sections 100 of the fingers 96 outside of the recess 106 is less than the diameter of the interior surface 72 of the insert 62.

The fingers 96 can be moved out of the collapsed position into an expanded position by a rigid plunger or core 112 attached to the plate assembly 80. As best seen in FIGS. 6C and 6D, the core 112 has a lower end terminating in a clamp ring 113 that is clamped between the plates 80a and 80b of plate assembly 80 and extends upward into the sleeve 94. The core 112 has an outer diameter that is greater than the inner diameter circumscribed by the vertical sections 104 of each finger 96 in the collapsible position. The core 112 also has a central axial bore 117 (FIGS. 6C, 6D, and 11) extending axially therethrough in order to permit pressurized air to be directed through the core 112 and into the mold cavity 38 to inflate a parison. When the core 112 moves upwardly with upward movement of the plate assembly 80, the outer diameter of the upper end of the core 112 engages the surfaces 102 of the fingers 96 and progressively forces the upper section 100 of each finger 96 outwardly toward the collar 90. In this configuration, the diameter D2 (FIG. 11) circumscribed by the aligned recesses 106 of each finger 96 is approximately equal to the inner diameter of the interior surface 72 of the insert 62 and preferably slightly larger than the inner diameter of the insert 62. Thus, in the expanded position, the fingers 96 are capable of securely engaging an insert 62 between the shoulder 108 and tab 110 such that the insert 62 is securely held in the mold cavity 38 during the blow molding process. The increased diameter annular surface collectively formed by the thickened portions of the fingers 96 beneath the steps 108 also seals against the ID of the insert 62 sufficiently to prevent plastic from the parison from invading the threads from below. The annular surface formed by the interior vertical surfaces 104 of the fingers 96 also seals against the core 112 sufficiently to permit pressurized air from short circuiting the mold between the fingers during the blow molding process.

Referring now to FIGS. 14-18, the molding apparatus 20 also includes an insert supply mechanism 115 disposed beside the collapsible mount assembly 76. The supply mechanism 115 can be any conventional mechanism used in the art, but preferably is formed as a hopper 116 containing a number of inserts 62, a retractable supply arm 118 extending outwardly from the hopper 116, and a grabber 120. The grabber 120 has a pair of opposed fingers 120A and 120B that can move toward and away from one another to grip and release an insert. Hence, the arm 118 and grabber 120 can receive an insert 62 from the hopper 116 and position the insert to a position directly and concentrically above the collapsible mount 88 on the assembly 76, but below the mold cavity 38. Alternatively, the inserts 62 can be loaded on collapsible mount assembly 76 by a vertically movable device or even loaded manually.

Figure 16:
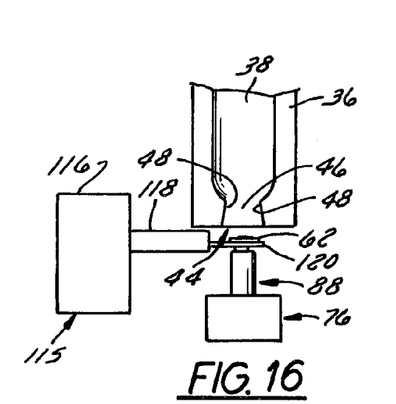
Figure 17:
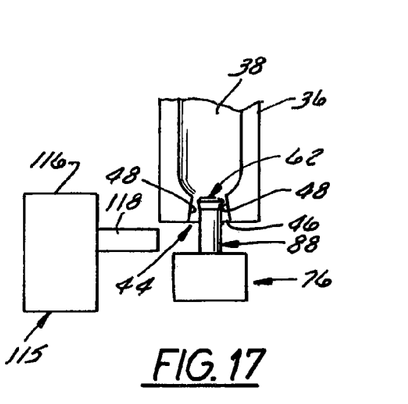

Having described the components of the molding apparatus 20, its operation will now be discussed. The supply mechanism 115 operates to engage an insert 62 within the grabber 120 and position the insert 62 directly over the collapsible mount assembly 76 (compare FIG. 14 with FIG. 15). Once the insert 62 is thus positioned, the assembly 76 is lifted as whole by piston 75 to raise the fingers 96, which are in the collapsed position, through the insert 62, as seen in FIGS. 9 and 16. Also, in this position the recesses 106 on each finger 96 are aligned with the interior surface 72 of the insert 62. If desired, proper alignment of the insert 62 and the collapsible core can be assured by configuring the grabber 120 so that it can move a limited amount or "float" within a horizontal plane. In this case, the grabber 120 could be provided with an indexer, such as a pair of horizontal fingers (not shown) that extend over the opening and top of the insert such that when the collapsible core extends upwardly, the fingers and the upper part of the core would engage the horizontal fingers to align the insert 62 with the fingers and core. The grabber 102 then releases the insert 62, the arm 118 retracts, and the assembly 76 is lifted by the cylinder 79 to place the insert 62 between the mold halves 36, as seen in FIG. 17.

Figure 10:
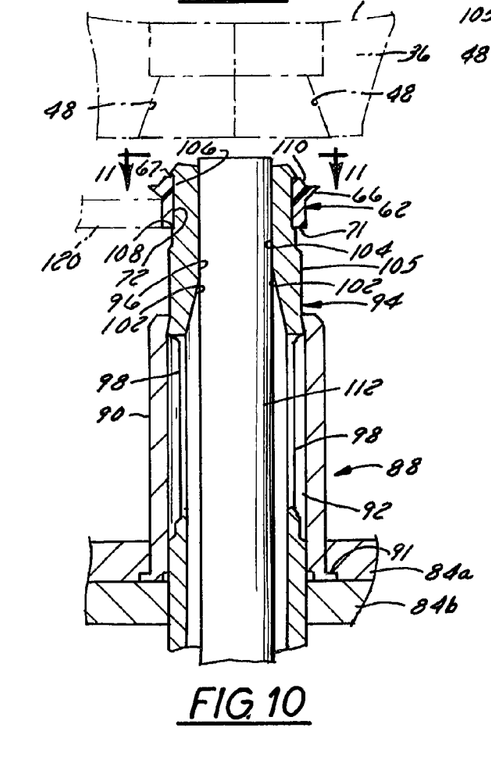
FIG. 10 is a cross-sectional elevation of the collapsible mount engaged with the insert.
Figure 11:
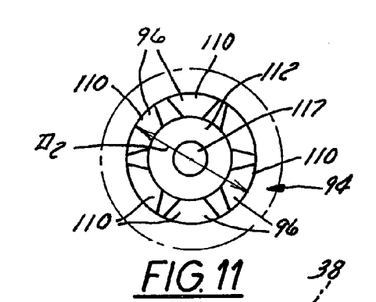
FIG. 11 is a cross-sectional elevation view taken generally along line 11-11 of FIG. 10.
Figure 12:
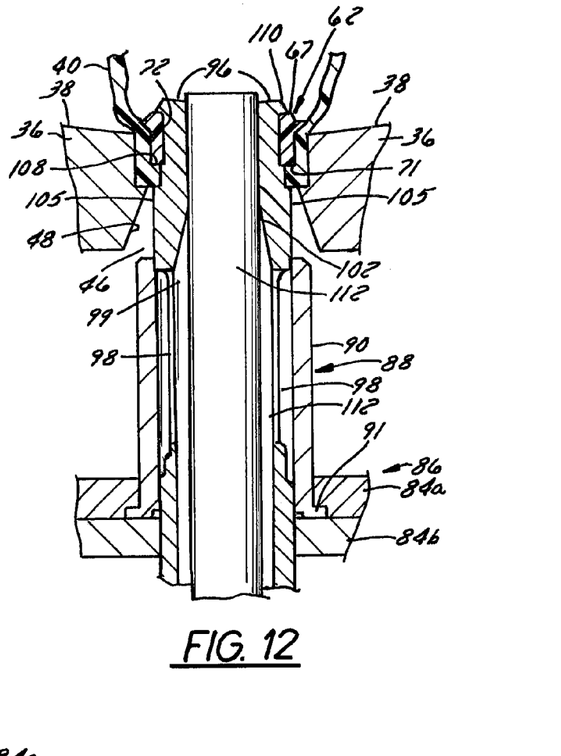
FIG. 12 is a cross-sectional elevation of the collapsible mount supporting the insert within the mold assembly.
Figure 13:
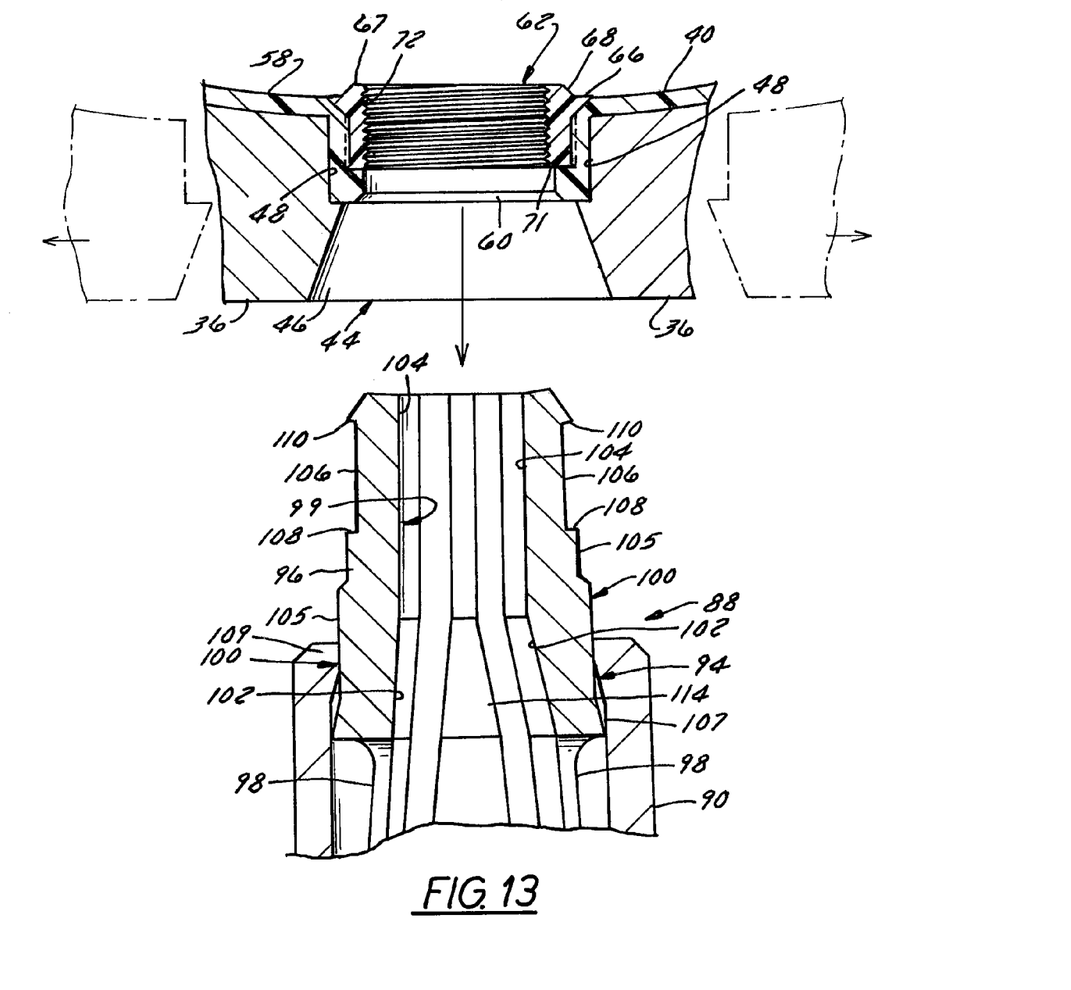
FIG. 13 is a cross-sectional elevation of the collapsible mount disengaged from the insert integrally attached to a tank liner formed in the mold assembly.
Figure 14:
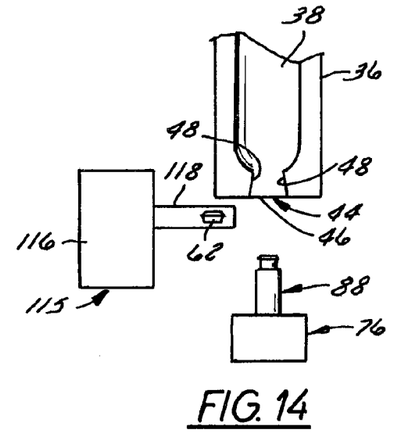
FIGS. 14-18 are schematic elevation views collectively showing the sequence of a tank liner molding operation performable using the apparatus of FIGS. 1-13, a schematic elevation of the mold assembly and the collapsible mount of FIG. 1 in an operative position with respect to an insert supply device.
Figure 15:
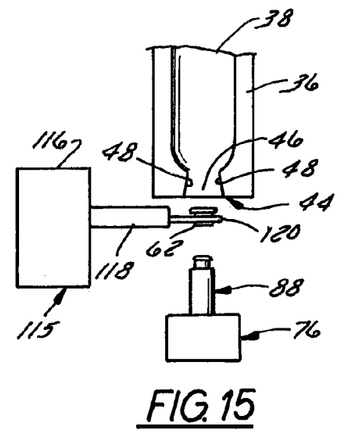

Once the collapsible mount 88 is properly positioned, the pistons 86a and 86b are extended to raise the lowermost plate assembly 80 with respect to the plate assemblies 82 and 84 (compare FIG. 6D to FIG. 6C). During this motion, the core 112 moves upwardly through the mount 88 into engagement with the throat 114, contacting the tapering surfaces 102 of each finger 96 (Compare FIG. 9 to FIG. 7). Continued upward motion of the core 112 urges the fingers 96 into the expanded position where the fingers 96 tightly engage the interior surface 72 of the insert 62 within the recesses 106 on each finger 96, as seen in FIGS. 10 and 11. Further, the insert 62 is maintained within the recesses 106 by the presence of the shoulders 108 and tabs 110 on opposite sides of each recess 106. In this position, the insert 62 is reliably and fixedly held on the mount 88, and an airtight seal is formed between the core and the fingers 96 and between the fingers 96 and the insert 62.

Next, referring now to FIGS. 1, 2, 12, 17 and 18, a parison is discharged into the open mold cavity 38 from a head 122 located above the mold sections 36, and the mold sections 36 are driven toward one another to clamp the parison between them and the insert 62. The fingers 96 prevent the insert from radially deforming during mold closure. The radial seal between the fingers 96 and the bottom portion of the inner peripheral surface of the insert 62 also prevents plastic from flowing into the insert 62 from below.

The blow molding apparatus 20 is then operated in a conventional blow molding fashion by forcing air through the core 112 from below to expand the parison to form the tank liner 40. The seal between the outer diameter of the core 112 and the uninterrupted annular surface formed by the collective inner surfaces 114 of the fingers 96 also prevents the injected air from exiting the mold-cavity between the core 112 and the fingers 96.

Figure 18:
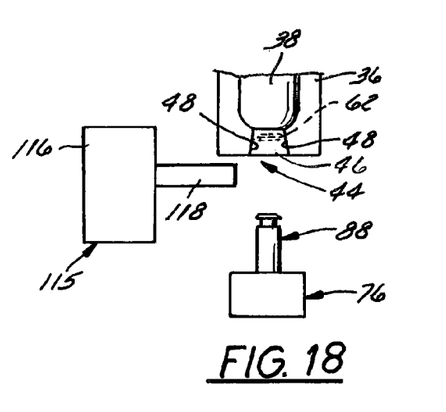

After the tank liner 40 is fully formed within the cavity 38 and the material forming the tank liner 40 is allowed to partially cool, the air pressure is relieved through the core 112, and the assembly 76 operates the pistons 86a and 86b to lower the core 112 and the plate assembly 80 with respect to the plate assemblies 82 and 84. As the core 112 moves out of the throat 114 of the mount 88, the fingers 96 are allowed to collapse inwardly towards one another due to the removal of the outward bias supplied by the core 112. By moving into the collapsed position, each of the fingers 96 becomes disengaged from the interior surface 72 of the insert 62. Finger retraction can be facilitated through the provision of a spring (not shown). If desired, positive retraction can also be assured by relative motion between the plate assemblies 82 and 84. That is, as plate assembly 80 approaches the bottom of its downward stroke, the plate assembly 80 engages the heads of the shoulder bolts 85 and pulls the uppermost plate assembly 84 downwardly toward the plate assembly 82 as seen in FIG. 6C. As a result, the collar 90 moves downwardly relative to the fingers 96, causing the lip 109 on the ID of the collar 90 to engage the lugs 107 on the fingers 96 to drive the fingers inwardly. The cylinder 79 can then be retracted to return the assembly to its lowered position as seen in FIG. 18, hence disengaging the assembly 76 from the insert 62 and readying the assembly 76 for the next cycle.

Once the material forming the tank liner 40 has further cooled to a sufficient extent, the mold sections 36 are driven apart to open the mold, and the newly formed tank liner 40 can be removed from the molding apparatus 20 via a picker 124 (FIGS. 1 and 2) in a conventional manner. The cycle can then be repeated.

For each of the components of the assembly 76 for which it has not been specified previously, these components are preferably formed of a rigid material, such as a metal and preferably steel, that is capable of supporting the weight of the other components of the assembly 76 and/or is capable of withstanding the temperatures and pressures utilized in a blow molding process.

Many changes and modification could be made to the invention, in addition to those already described, without departing from the spirit thereof. For instance, the "positive retract" feature provided by the engagement of the plate assembly 80 with the heads of the shoulder bolts 85 could be eliminated. In addition, the cylinder 79 could be eliminated to leave the mount assembly 76 vertically stationary, so long as the remaining components are configured to permit 1) loading of inserts 62 onto the assembly 76, 2) mold opening and closing without interference with the assembly 76, and 3) vertical removal of the molded article from the assembly 76. The scope of still additional variations falling within the scope of the present invention will become apparent from the appended claims.

I hereby claim:
1. In combination:
(A) an insert around which a blow molded article is to be molded, the insert being formed of a more rigid material than the material of the blow molded article; and
(B) a apparatus for forming the blow molded article integrally with the insert, the apparatus comprising:
a) a movable collapsible mount including a plurality of fingers that are located peripherally of one another to define a central passage, and a core insertable into the central passage to engage and move at least upper ends of the fingers outwardly with respect to a radial centerline of the passage to engage the insert, and b) a mold that is selectively closable to form a blow molding cavity that surrounds at least a portion of the insert while the insert is being held in position by the collapsible mount.

2. The combination of claim 1, wherein the collapsible mount further comprises vertically movable platform on which the core is mounted.

3. The combination of claim 2, wherein the collapsible mount further comprises a second platform which is located above the first platform and which supports the fingers.

4. An apparatus for forming a blow molded article integrally with an insert, the apparatus comprising:

a) a movable collapsible mount including a plurality of fingers that are located peripherally of one another to define a central passage, and a core insertable into the central passage to engage and move at least upper ends of the fingers outwardly with respect to a radial centerline of the passage to engage the insert, and b) a mold that is selectively closable to form a blow molding cavity that surrounds at least a portion of the insert, wherein the collapsible mount further comprises vertically movable platform on which the core is mounted, wherein the collapsible mount further comprises a second platform which is located above the first platform and which supports the fingers, and wherein the collapsible mount further comprises a third platform that is located above the first and second platforms and a collar that is mounted in a through opening in the third platform in a surrounding relationship with the fingers.

5. The apparatus of claim 4, wherein the collapsible mount is movable vertically relative to the mold.

6. The combination of claim 1, wherein the core and the fingers are configured such that, when the core is fully inserted into the fingers and the fingers are fully expanded, the core seals against the fingers and the outer surfaces of the fingers form an uninterrupted circular surface.

7. The combination of claim 1, wherein each of the fingers is biased towards a collapsed position.

8. The combination of claim 7, wherein each of the number of fingers includes a relatively thin, lower section and a relatively thick, upper section.

9. The combination of claim 1, wherein the core is hollow and is adapted to be connected to a forced air supply that can supply pressurized air into the mold cavity through the core.

10. The combination of claim 1, wherein each finger is recessed near an end thereof to form an axially-extending retaining surface that is flanked by surfaces above and beneath the retaining surface, and wherein the insert is retained in the retaining surfaces of the fingers during a blow-molding operation.

\* \* \* \* \*